(12) United States Patent
Ehrmann et al.

(10) Patent No.: US 6,364,004 B1
(45) Date of Patent: Apr. 2, 2002

(54) COOLING FAN, IN PARTICULAR A RADIATOR FAN FOR MOTOR VEHICLES

(75) Inventors: Martin Ehrmann, Nuremberg; Dietrich von Knorre, Oldenberg, both of (DE)

(73) Assignees: Temic Telefunken microelectronic GmbH, Nuremberg; Temic Automotive Electric Motors GmbH, Oldenburg, both of (DE)

( * ) Notice: Subject to any disclaimer, the term of this patent is extended or adjusted under 35 U.S.C. 154(b) by 0 days.

(21) Appl. No.: 09/677,052

(22) Filed: Sep. 29, 2000

(30) Foreign Application Priority Data

Oct. 13, 1999 (DE) .......................................... 199 49 321

(51) Int. Cl.[7] .............................. F28F 7/00; F28F 13/12; F01P 1/06
(52) U.S. Cl. ..................... 165/125; 165/121; 165/80.3; 123/41.31
(58) Field of Search ........................... 165/51, 80.3, 44, 165/121, 125; 123/41.31, 41.11; 361/697

(56) References Cited

U.S. PATENT DOCUMENTS

| | | | |
|---|---|---|---|
| 4,668,898 A | | 5/1987 | Harms et al. |
| 4,699,208 A | * | 10/1987 | Wolf et al. ................. 165/80.3 |
| 4,709,560 A | * | 12/1987 | Voorhis et al. ............. 165/125 |
| 5,242,013 A | * | 9/1993 | Couetoux et al. ........... 165/121 |
| 5,947,189 A | * | 9/1999 | Takeuchi et al. ............ 165/121 |
| 6,203,293 B1 | * | 3/2001 | Yamamoto .................. 165/121 |

FOREIGN PATENT DOCUMENTS

| | | |
|---|---|---|
| DE | 3517149 | 11/1986 |
| DE | 3820857 | 12/1989 |
| DE | 4418000 | 11/1995 |
| DE | 19612679 | 10/1997 |

* cited by examiner

Primary Examiner—Ira S. Lazarus
Assistant Examiner—Tho Van Duong
(74) Attorney, Agent, or Firm—W. F. Fasse; W. G. Fasse

(57) ABSTRACT

A cooling fan, in particular a radiator fan for a motor vehicle, includes an electronically commutated electric motor and an electronics casing (21) with an electronic control for controlling the electric motor. The outer surface of the electronics casing (21) has cooling fins (25), the free ends of which project into the cold air flow produced by the impeller (9) of the fan. The free ends (27) of the cooling fins (25) projecting into the cold air flow have air diverting elements through which a part of the predominantly axial cold air flow produced by the impeller (9) is diverted in a radial direction relative to the impeller (9) and then in the longitudinal direction of other ends (29) of the cooling fins (25) arranged on the surface of the electronics casing (21). This provides effective cooling of the electronics casing.

11 Claims, 3 Drawing Sheets

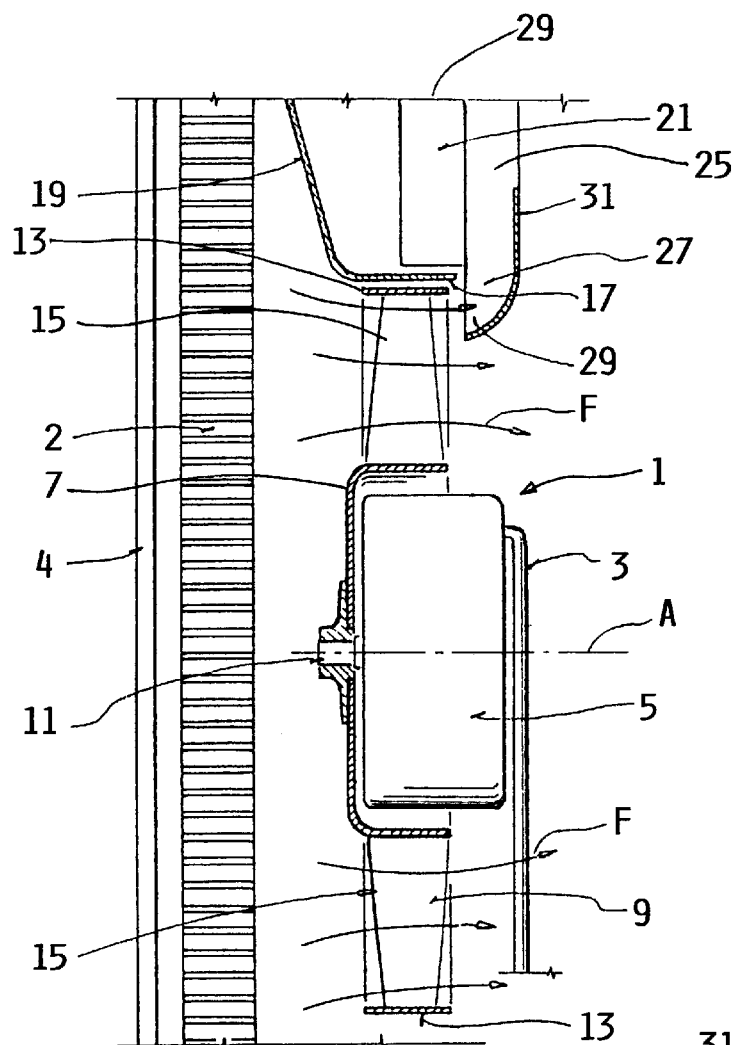
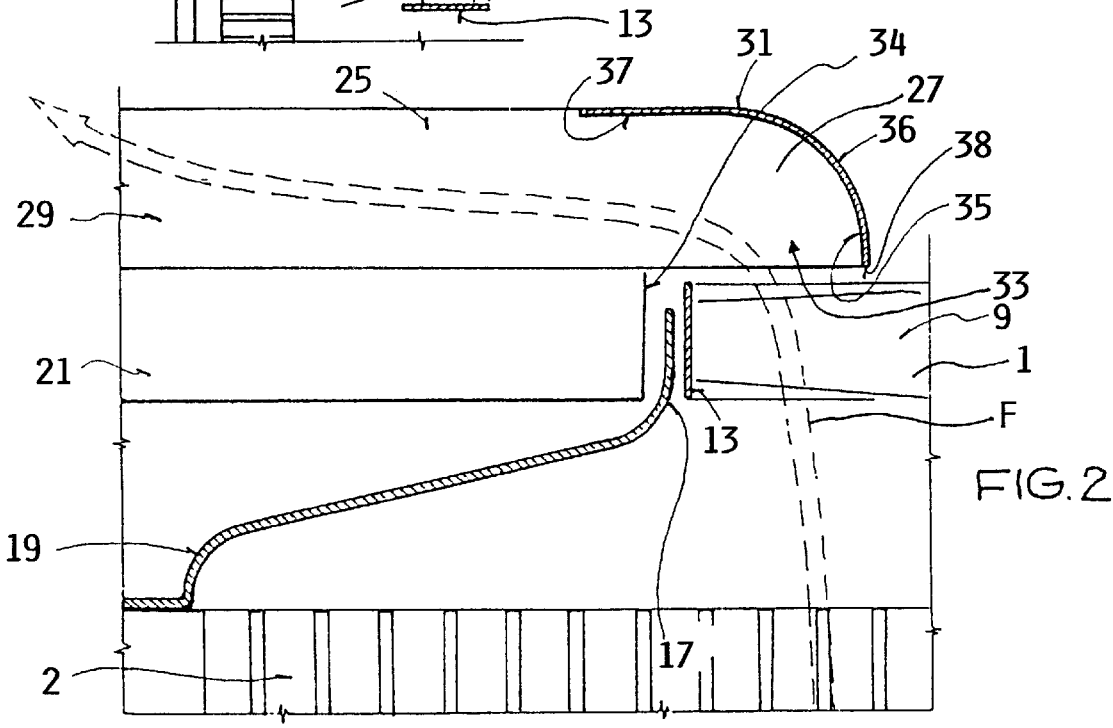
FIG. 1
FIG. 2

COOLING FAN, IN PARTICULAR A RADIATOR FAN FOR MOTOR VEHICLES

FIELD OF THE INVENTION

The present invention relates to a cooling fan, in particular to a radiator fan for motor vehicles with an electronically commutated electric motor.

BACKGROUND INFORMATION

Because of the aerodynamic optimization (C-values), fan wheels with specific diameters are required for cooling internal combustion engines. This restriction also applies to condenser fans which are arranged in front of the actual radiator and condenser of the air-conditioning unit. There is therefore a demand for compact electric fans with a short length, for which a speed adjustment is also desirable for reasons of noise and performance. For this, a conventional electric motor with brushes and an electronic combinational circuit module is particularly suitable or even a brushless motor with corresponding power electronics.

To minimize interference, the electronics must be located as close as possible to the motor because the short cables radiate less interference energy. But, on the other hand, direct heat transfer from the motor to the electronics must be avoided. For this purpose, according to U.S. Pat. No. 4,668,898 the electronics are arranged in their own control casing which is connected to the motor casing by struts. This electronically commutated motor is not suitable for a compact fan for cooling internal combustion engines.

Furthermore, an electric motor with an external rotor and a fan wheel connected to it is known from German Patent Laying-Open Document 38 20 857, in which the electric motor is designed as a direct-current motor with electronic commutation. In this case, the electronic components are arranged on a printed circuit board, which is attached to a fan casing which has cooling fins. This electronically controlled direct-current motor cannot be used for cooling condensers and/or radiators in motor vehicles.

An electronically controlled electric motor with a fan wheel for sucking in cold air is also known from German Patent Laying-Open Document 44 18 000 A1, in which the drive electronics are axially continued in a control casing which has cooling fins arranged at least on its external peripheral surface in the direction of flow of the cold air flow produced by the fan wheel. This motor certainly has a compact design, but its axial extension prevents easy mounting because of the very limited space available between the radiator and the engine in a motor vehicle.

Finally, a radiator fan for motor vehicles with an electronically commutated electric motor is known from German Patent Laying-Open Document 196 12 679 A1, in which the drive electronics are arranged in a control casing which is connected to the radiator casing. This control casing is attached to the radiator casing outside the outer ring of the fan wheel and has cooling fins which project as far as the center of the cold air flow.

SUMMARY OF THE INVENTION

The object of the invention is to further develop a cooling fan, in particular a radiator fan for motor vehicles, in such a manner that an even better cooling of the electronics in the electronics casing is achieved.

The above object has been achieved according to the invention in a cooling fan, in particular a radiator fan for motor vehicles, arranged in a radiator casing with an electronically commutated electric motor, a fan wheel or impeller driven by its rotor, and electronics influencing the speed and/or output of the electric motor, which are arranged in an electronics casing attached to the radiator casing radially outside the impeller. The outer surface of the electronics casing has cooling fins, the free ends of which project into the cold air flow produced by the impeller. According to the invention, the free ends of the cooling fins projecting into the cold air flow have air diverting elements, through which a part of the predominantly axial cold air flow produced by the impeller is diverted in a radial direction relative to the impeller and then in a longitudinal direction of and toward the other ends of the cooling fins arranged on the surface of the electronics casing.

The cooling fan according to the invention is characterized by an improved cooling effect of the electronics casing, for which only simple additional tools and/or slight constructional changes are required in comparison to the known fans.

In an advantageous embodiment of the invention, the air diverting elements comprise an air-guiding sheet-metal plate that covers the free ends and the back edges of the cooling fins so as to close the back of hollow spaces between adjacent ones of the cooling fins. This achieves a simple diversion of a part of the axial cold air flow by means of a simple baffle plate. This in turn ensures that the cold air sweeps over the whole length of the cooling fins.

According to a further embodiment of the invention, the free ends of the cooling fins projecting into the cold air flow are shaped to extend counter to the rotational direction of the impeller in such a manner that the tangential air flow produced by the impeller is diverted radially outward. This guarantees a sure diversion of part of the cold air flow produced in the rotational direction of the fan wheel by means of the special shape of the free ends of the cooling fins.

BRIEF DESCRIPTION OF THE DRAWINGS

The invention will be described in the following, in connection with several example embodiments, with reference to the drawings, wherein:

FIG. 1 shows a cross-section of a radiator fan according to the invention;

FIG. 2 schematically shows a cross-section of the electronics casing in a first embodiment of the inventive fan arrangement, as an enlarged detail view of a portion of FIG. 1;

DETAILED DESCRIPTION OF THE PREFERRED EMBODIMENTS

Figure 3:
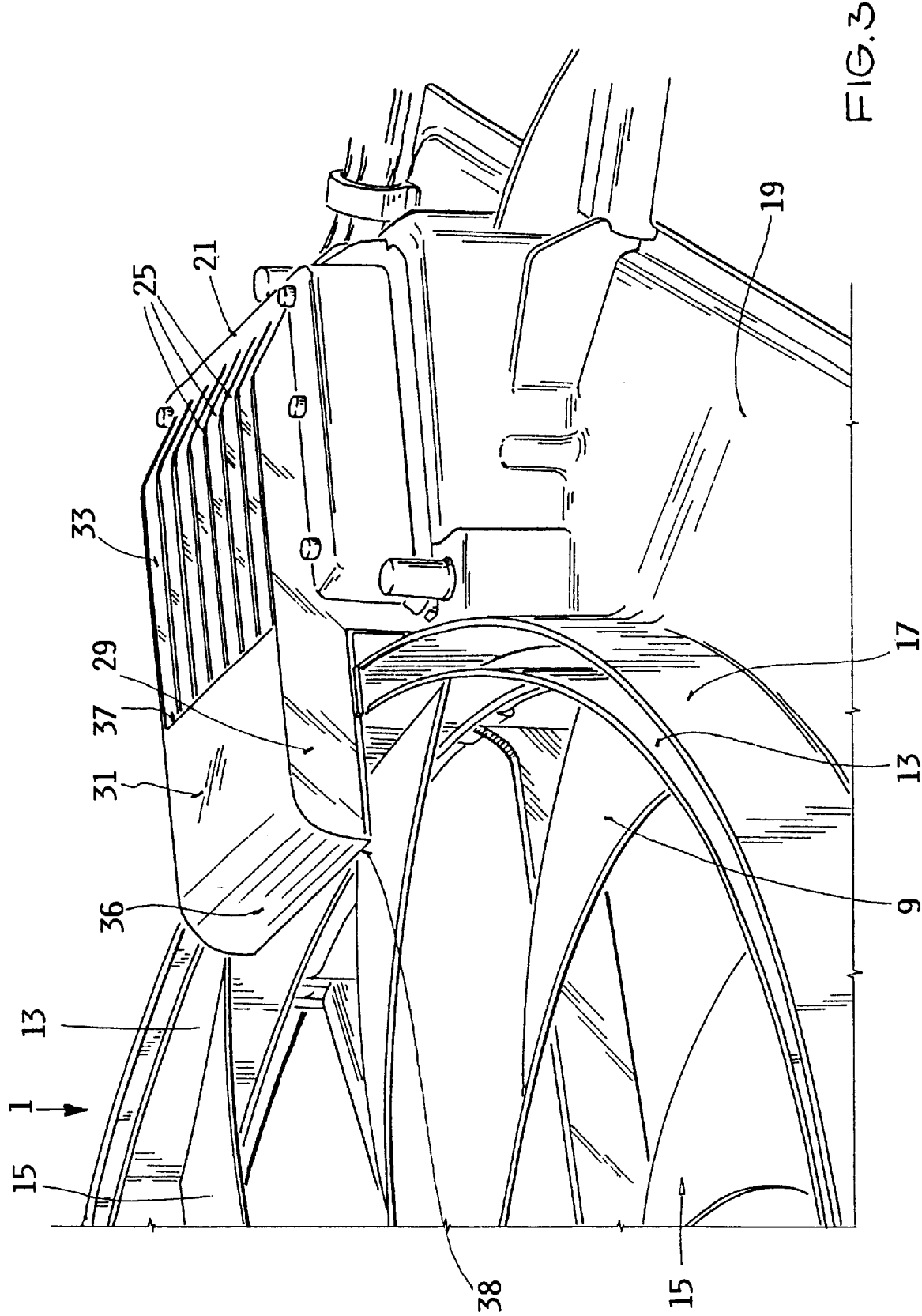
FIG. 3 is a perspective view of the arrangement of FIG. 1.

FIGS. 1 and 2 show a cross-section through a radiator fan 1 for motor vehicles designed as a cooling fan with an electronically commutated electric motor, which consists, in particular, of a brushless direct-current motor 3 designed as an external rotor motor. By means of this fan 1, cooling air is sucked through an air conditioning system condenser 2 and an engine cooling system radiator 4 of the motor vehicle. A pot-shaped hub 7 of a fan wheel or impeller 9 is placed over the casing 5 of this direct-current motor 3, whereby the hub 7 is connected with no rotational freedom of movement to the drive shaft 11 of the direct-current motor 3. The fan wheel 9 has an outer ring 13 which is rigidly connected to the outer ends of the fan vanes or blades 15 and which is surrounded by an air-guide ring 17 of a frame, i.e. fan shroud or housing 19 shaped concentrically to this outer ring 13.

An electronics casing 21 is attached to the frame 19 and/or the radiator casing, which is not shown in the figures, at a location radially outside the outer ring 13 of the fan wheel 9 relative to the center rotation axis A of the fan wheel 9. In order to better dissipate the heat produced by the electronic components in the electronics casing 21, cooling fins 25 are provided on the electronics casing 21. Free ends 27 of the cooling fins 25 point and extend longitudinally toward the center of the cooling air flow F produced by the fan wheel 9.

Effective dissipation of the heat from the electronics casing 21 is achieved by means of the free ends 27 of the cooling fins 25 projecting into the air flow F, whereby the free ends 27 have air diverting elements, e.g. 31, through which a part of the predominantly axial cooling air flow F produced by the fan wheel or impeller 9 is diverted into a radial outward direction relative to the axis A of the impeller 9, and then in the longitudinal direction toward the other ends 29 of the cooling fins 25 arranged on the surface of the electronics casing 21. This ensures that the cold air sweeps longitudinally along the whole length of the cooling fins 25, thereby ensuring that the heat can be dissipated.

According to FIGS. 1, 2 and 3, the air diverting elements consist of an air-guiding sheet-metal plate 31 which provides an air-tight cover of the hollow spaces 33 respectively between the adjacent free ends 27 of the cooling fins 25. Thereby the plate 31 is arranged on the radially inner end edges 35 and on the rear edges 37 of the cooling fins 25 facing away from the impeller 9. This covering runs from the radially inner ends 35 of the fins 25 up to the area of the radially inner surface 34 of the electronics casing 21, whereby this radially inner surface 34 is arranged to face the air-guide ring 17 with an air gap therebetween. This ensures that the electronics casing 21, which consists of a cast aluminum part together with the integrally arranged cooling fins 25, can be removed easily from the mold used for forming it.

The free ends 27 of the cooling fins 25 are advantageously curved or rounded toward the electronics casing 21, from the radially inner corners 38 facing the impeller 9 to the rear edge 37 facing away from the impeller 9. The air-guiding sheet-metal plate 31 has an appropriate curvature 36 for diverting the substantially axial air flow F radially outward.

Figure 4:
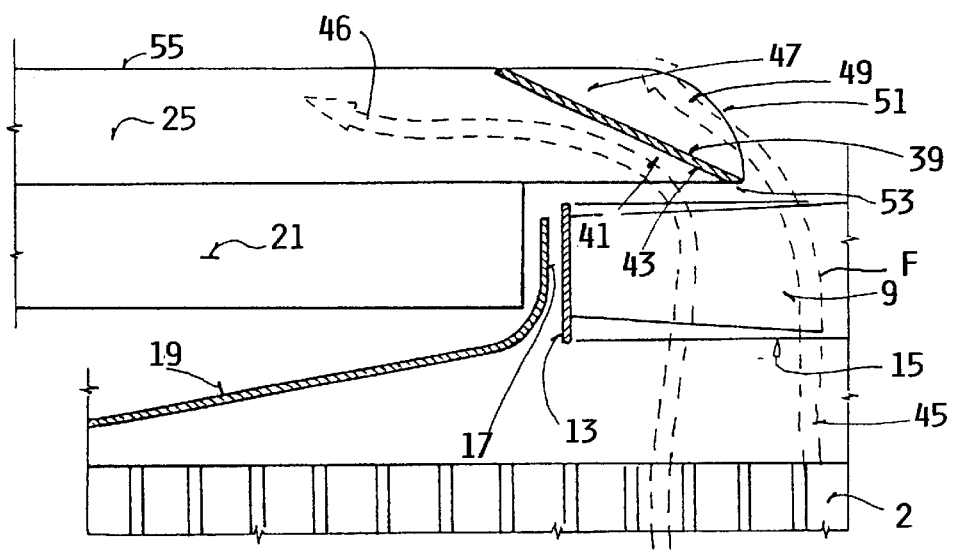
FIG. 4 is a schematic cross-sectional view of a second embodiment of the electronics casing.

An effective dissipation of the heat from the electronics casing 21 is achieved according to FIG. 4 by means of an air-guiding sheet-metal plate 39 (instead of curved plate 31), which is linearly slopingly shaped within the hollow spaces 41 respectively between the cooling fins 25. The plates 39 respectively extend linearly from the free ends 43 of the fins 25 facing the impeller 9 obliquely relative to the direction 45 of the axial air flow F of the impeller 9, radially outward into the area of the frame 19 surrounding the impeller 9. In this case, the cooling fins 25 run above and below the obliquely arranged air-guiding sheet-metal plate 39, in which the parts 47 of the cooling fins 25 arranged above the air-guiding sheet-metal plate 39 each have a curvature 51 at their free ends 49 which runs from the radially inner corners 53 of the free ends 49 of the cooling fins 25 outward to the rear edges 55 of the fins 25. The plates 39 divert a part of the cooling air flow F from the substantially axial flow direction 45 to a substantially radial or outward flow direction 46 longitudinally along the cooling fins 25.

Figure 5:
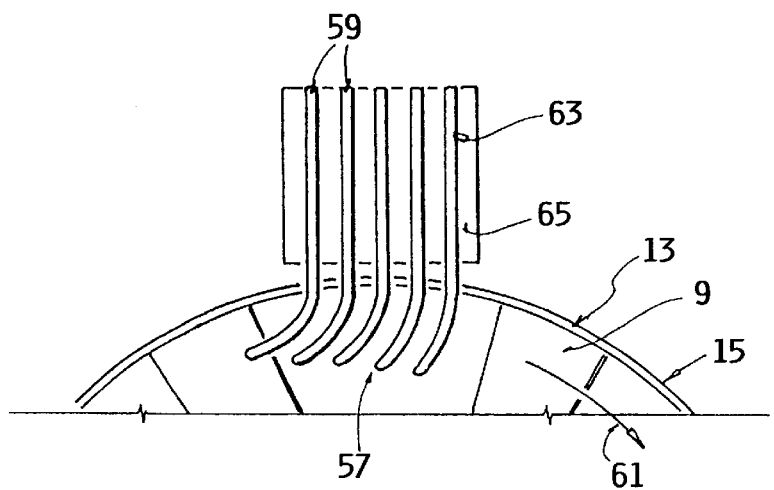
FIG. 5 is a schematic axial view of a first embodiment of the free ends of the cooling fins.
Figure 6:
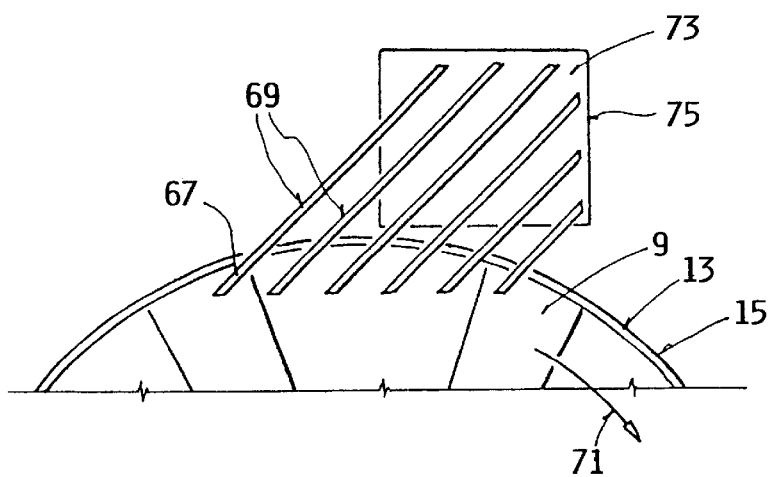
FIG. 6 is a schematic axial view of a second embodiment of the cooling fins.

FIGS. 5 and 6 show further embodiments for diverting the cooling air flow, in which the free ends 57, 67 of the cooling fins 59, 69 projecting into the cooling air flow are shaped to face contrary to or against the rotational direction 61, 71 of the impeller 9. According to FIG. 5, the free ends 57 of the cooling fins 59 are curved to face contrary to or against the rotational direction 61 of the impeller 9, so that the cooling air flow, and particularly the tangential component of the air flow in the rotational direction 61, can be guided without turbulence losses to the other ends 63 of the cooling fins 59 on the electronics casing 65. In particular, these other ends 63 of the cooling fins 59 run linearly in a radial direction relative to the impeller 9.

According to FIG. 6, the free ends 67 of the cooling fins 69 projecting into the cooling air flow run tilted or angled toward being tangential to the rotational direction 71 of the impeller 9 and have a linear shape. These cooling fins 69 run linearly on the surface 73 of the electronics casing 75.

What is claimed is:

1. A cooling fan arrangement comprising:
   an electronically commutated electric motor including a motor rotor;
   a fan impeller connected to said motor rotor to be rotationally driven about a rotation axis so as to produce an air flow that flows predominantly axially parallel to said rotation axis;
   a housing in which said fan impeller is arranged, with said housing extending radially outwardly relative to said fan impeller;
   electronics that are electrically connected to said electric motor and are adapted to influence at least one of a rotation speed and an output of said electric motor;
   an electronics casing in which said electronics are arranged, and which is attached to said housing radially outwardly relative to said fan impeller, and which has an outer casing surface;
   cooling fins which respectively include fixed ends that are arranged on and extend in a longitudinal direction along said outer casing surface of said electronics casing, and free ends that project from said electronics casing so as to overlap a radially outermost extent of said fan impeller and so as to be adapted to reach into said air flow; and
   at least one air diverting element that is provided on said free ends of said cooling fins adapted to reach into said air flow, and that is configured, arranged and adapted to divert a part of said air flow radially outwardly relative to said rotation axis into said longitudinal direction toward and along said fixed ends of said cooling fins.

2. The cooling fan arrangement according to claim 1, wherein said cooling fan arrangement is a radiator fan for a motor vehicle, and said housing is a radiator housing, and further comprising a radiator connected to said radiator housing on a side of said fan impeller opposite from said electronics housing and said cooling fins.

3. The cooling fan arrangement according to claim 1, wherein said cooling fins are respectively bounded along rear edges opposite said outer casing surface and free end edges at which said free ends terminate projecting away from said electronics casing, wherein said cooling fins are spaced apart from one another with respective hollow spaces therebetween, and wherein said at least one air diverting element comprises an air-guiding sheet-metal plate that is arranged on said free end edges and said rear edges of said cooling fins so as to air-tightly cover said hollow spaces along said free end edges and said rear edges at least in an area extending from said free end edges along said rear edges at least outwardly beyond said radially outermost extent of said fan impeller.

4. The cooling fan arrangement according to claim 3, wherein said free end edges have a curved contour transitioning into said rear edges, and wherein said air-guiding sheet-metal plate has a curvature matching said curved contour and adapted to divert said part of said air flow radially outwardly.

5. The cooling fan arrangement according to claim 4, wherein said curved contour is a rounded contour.

6. The cooling fan arrangement according to claim 1, wherein said cooling fins are spaced apart from one another with respective hollow spaces therebetween, wherein said at least one air diverting element comprises respective sheet-metal plates that are arranged in said hollow spaces between said free ends of said cooling fins, wherein each one of said sheet-metal plates has first and second ends and extends obliquely relative to said rotation axis from said first end, which is relatively closer to said rotation axis and to a fan plane on which said fan impeller lies perpendicular to said rotation axis, to said second end, which is relatively farther from said rotation axis and from said fan plane, and wherein said second end of each one of said sheet-metal plates is located radially outwardly beyond said radially outermost extent of said fan impeller.

7. The cooling fan arrangement according to claim 6, wherein said cooling fins are respectively bounded along rear edges opposite said outer casing surface and front edges that extend along a plane of said outer casing surface, and wherein said sheet-metal plates are respectively confined between said rear edges and said front edges of said cooling fins.

8. The cooling fan arrangement according to claim 1, wherein said fan impeller is adapted to be rotationally driven in a rotation direction about said rotation axis so as to produce said air flow, wherein said air flow includes a tangential air flow component that flows tangentially in said rotation direction, and wherein said free ends of said cooling fins are shaped to protrude from said electronics casing against said rotation direction so as to be adapted to divert said tangential air flow component radially outward.

9. The cooling fan arrangement according to claim 8, wherein said free ends of said cooling fins are curved to protrude from said electronics casing against said rotation direction.

10. The cooling fan arrangement according to claim 9, wherein said free ends of said cooling fins taper linearly on said outer casing surface of said electronics casing in a direction radial relative to said rotation axis.

11. The cooling fan arrangement according to claim 8, wherein said free ends of said cooling fins extend and protrude linearly from said electronics casing in a direction tilted toward being tangential to said rotation direction, and wherein said fixed ends of said cooling fins extend linearly on said outer casing surface of said electronics casing respectively linearly aligned with said free ends.

* * * * *